United States Patent [19]

Mikada et al.

[11] 4,065,803
[45] Dec. 27, 1977

[54] ELECTRONIC DEVICE FOR PREVENTING UNDESIRABLE EFFECT RESULTING FROM VOLTAGE FLUCTUATION

[75] Inventors: Hiroyuki Mikada, Kawasaki; Jyuji Kishimoto, Tokyo, both of Japan

[73] Assignee: Canon Kabushiki Kaisha, Tokyo, Japan

[21] Appl. No.: 638,802

[22] Filed: Dec. 8, 1975

[51] Int. Cl.² .............................................. H02H 3/24
[52] U.S. Cl. ......................................... 361/88; 363/19
[58] Field of Search ................ 317/31; 321/2; 361/90, 361/92, 88

[56] References Cited

U.S. PATENT DOCUMENTS

| | | | |
|---|---|---|---|
| 3,409,802 | 11/1968 | Savage | 317/31 |
| 3,435,320 | 3/1969 | Lee et al. | 321/2 |
| 3,912,977 | 10/1975 | Fillmore | 317/31 X |
| 3,953,768 | 4/1976 | Meredith | 317/31 |

*Primary Examiner*—Harry E. Moose, Jr.
*Attorney, Agent, or Firm*—Fitzpatrick, Cella, Harper & Scinto

[57] ABSTRACT

There is disclosed an electronic device which comprises means for detecting the occurrence of voltage fluctuation in the input or output voltage of a power source to produce an output signal, and means operative in response to the output signal for disabling a portion of the electronic device, such as a liquid crystal display element, thereby substantially elongating the lifetime of the particular portion of the electronic device.

6 Claims, 13 Drawing Figures

ELECTRONIC DEVICE FOR PREVENTING UNDESIRABLE EFFECT RESULTING FROM VOLTAGE FLUCTUATION

BACKGROUND OF THE INVENTION

1. Field of the Invention

The present invention relates to an electronic device, and particularly to an electronic device provided with means for preventing an undesirable effect or erroneous operation resulting from fluctuation of the voltage from a power source supplying the device with a driving voltage.

2. Description of the Prior Art

There have been known various power sources for supplying power to electronic devices, but the undesirable effect on the electronic devices due to fluctution of voltage is a serious problem, particularly in the case where a battery is employed as the power supply. As an example, a liquid crystal display (hereinafter referred to as an LCD) which is commonly used for an information display unit in a small electronic calculator is frequently driven by an alternating current, namely in such a way that the voltage across the electrodes of an LCD averaged in time is zero or is close thereto, in order to extend the lifetime of an LCD element.

However, in case an LCD is driven by a power source with a considerable fluctuation of voltage, such as a battery, a supply voltage outside of a certain tolerance range fails to provide normal operation of the drive circuit of the LCD or the logic unit or control unit for generating an indicator signal for the LCD, thus leading to a situation where the voltage applied to the LCD averaged in time is not equal or close to zero. In such a case, the lifetime of the LCD is significantly shortened. Further, fluctuation of the voltage causes erroneous calculation. In order to prevent the drawbacks mentioned above, it has been attempted in prior art electronic devices to supply the subject circuit with a power supply voltage through a voltage stabilizing circuit in order to reduce the effect of fluctuation of the voltage, or to provide a voltmeter for indicating the voltage of the power supply, thereby instructing the user to recharge or replace the battery contained in the electronic device when the indication of such voltmeter reaches a certain limit voltage.

However, the output characteristics of such a voltage stabilizing circuit change when the voltage supplied thereto is located outside the particular voltage control range, and become unsuited for driving the electronic device in a stable manner. Also, the users of such electronic devices often do not notice such a change in the output voltage of the power source.

Further, a voltmeter provided on the electronic device for indicating the output voltage of the power source requires constant attention by the users as to whether the voltage of the battery is located within a range allowing stable operation, and this becomes burdensome to the users.

SUMMARY OF THE INVENTION

The present invention provides an electronic device having means for controlling the voltage supplied to the device from a power source in response to the change of the source output voltage, thereby assuring stable operation.

An object of the present invention is to provide an electronic device provided with means for preventing erroneous operation of a part of said device resulting from fluctuation of the output voltage of the power source.

Another object of the present invention is to provide an electronic device having means for retaining performance of minimum necessary functions in case of an eventual fluctuation of the voltage of the power source.

A further object of the present invention is to provide an electronic device having means for interrupting the supply of power to an indicating device in case the output of the power source is substantially lowered.

A still further object of the present invention is to provide an electronic device provided with means for automatically disconnecting the liquid crystal display device from the power source in case the output voltage is located outside a predetermined range.

Other objects of the present invention will be made clear from the following explanation with particular reference to the attached drawings.

DESCRIPTION OF THE PREFERRED EMBODIMENTS

In the following there is given an explanation on an embodiment of the present invention with reference to the attached drawings.

Figure 1:
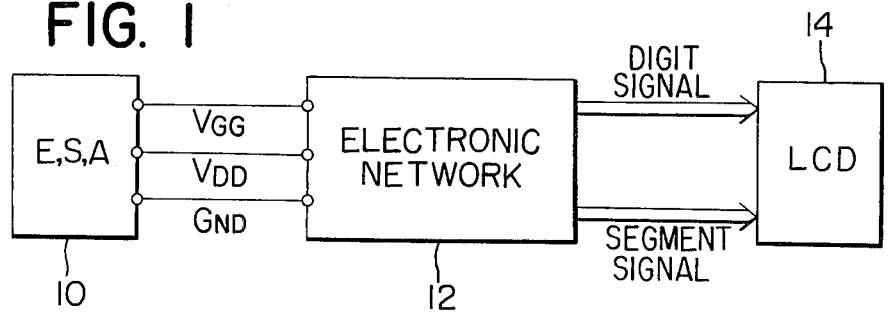
FIG. 1 is a basic block diagram showing an embodiment of the electronic device according to the present invention.

FIG. 1 is a basic block diagram of an embodiment of the present invention, wherein a power source unit 10 for driving, for example, a small electronic calculator supplies electric power to an electronic network 12 comprising a logic calculating unit and an LCD driving unit composed, for example, of MOS LSI's and an LCD 14. In the present embodiment, the power source unit 10 and the electronic network 12 are mutually connected by three power supply lines $V_{DD}$, $V_{GG}$ and GND, but the number of such power supply lines may be increased as necessary. The symbols $V_{DD}$ and $V_{GG}$ also signify the voltages applied to said power supply lines $V_{DD}$ and $V_{GG}$.

Figure 2:
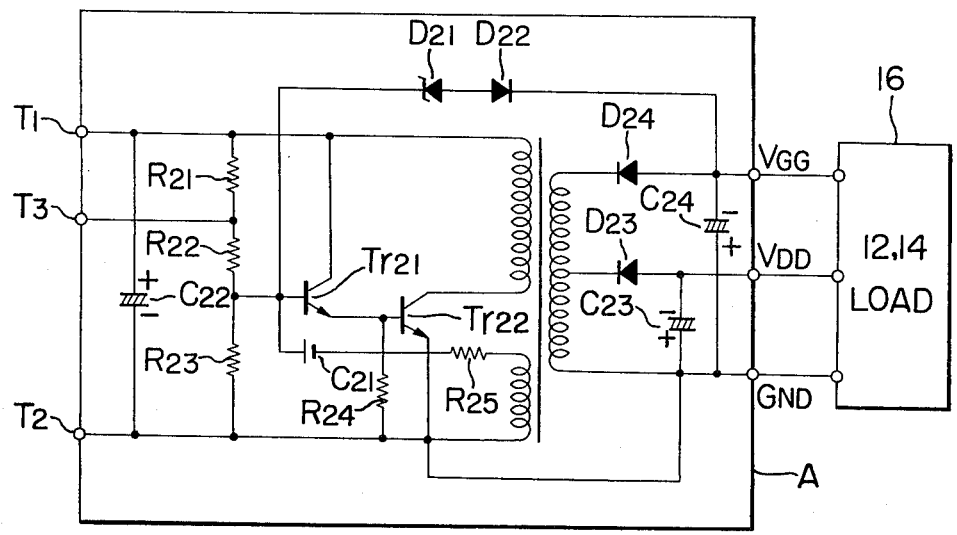
FIG. 2 is a more detailed circuit diagram of a voltage stabilizing unit in FIG. 1.

FIG. 2 is a circuit diagram of a DC-DC converter employed as a voltage stabilizing unit A in the power source unit 10 in FIG. 1, wherein 16 designates the load of power source unit 10 corresponding to the electronic network 12 and LCD 14 in FIG. 1. The voltage input ports $T_1$ and $T_2$ of the DC-DC converter A are connected to a power source such as a dry battery cell while $T_3$ designates an oscillation control terminal of the DC-DC converter A. The DC-DC converter A performs normal oscillation to generate output voltages $V_{DD}$ and $V_{GG}$ when a predetermined input voltage is supplied between said ports $T_1$ and $T_2$, but the oscillation can be terminated and the output voltages $V_{DD}$ and $V_{GG}$ do not appear if the potential of the control terminal $T_3$ is forcedly brought to zero or close thereto. In the present embodiment, the oscillation of the DC-DC converter A is controlled by changing the potential of said terminal $T_3$ according to the input supply voltage E so as to regulate the voltage supplied to the MOS LSI 12 close to zero, thereby preventing shortening of the lifetime of LCD 14 resulting from application of an abnormal drive voltage thereto.

Figure 3:
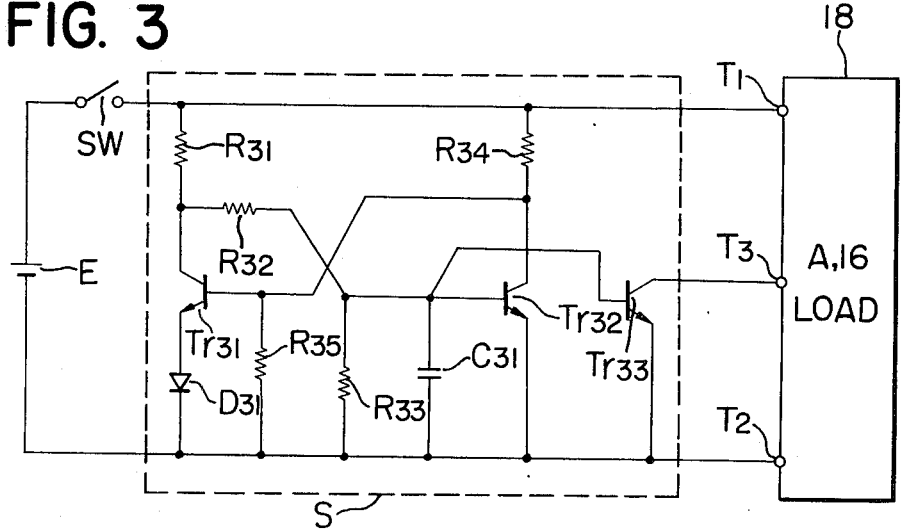
FIG. 3 is a circuit diagram of a control unit for controlling the voltage stabilizing unit.

FIG. 3 shows other components of said power supply unit 10 wherein E designates a power supply with a considerable fluctuation of voltage such as a battery which supplies an input voltage to the input ports $T_1$ and $T_2$ of the DC-DC converter A shown in FIG. 2 through a switch SW. The symbol E also signifies the output voltage of said power source E. There is provided an oscillation control circuit S for controlling the oscillation within the DC-DC converter A and it is composed of transistors $Tr_{31}$, $Tr_{32}$ and $Tr_{33}$, a diode $D_{31}$, a capacitor $C_{31}$ and resistors $R_{31}$, $R_{32}$, ... $R_{35}$. When said power source E is capable of supplying an output voltage $E_0$ necessary for normal function of LCD 14, the oscillation control circuit S is supplied with the voltage of power source E by the closure of switch SW to initiate the function thereof. Upon closure of said switch SW the transistor $Tr_{32}$ is forcedly shifted to its OFF state by the capacitor $C_{31}$, and the transistor $Tr_{31}$ is shifted to its ON state. Also the transistor $Tr_{33}$ is in the OFF state and the input port $T_3$ is thus in OPEN state. In this manner the DC-DC converter A performs normal oscillation to supply power to the load 16.

The operational conditions for said transistors $Tr_{31}$ and $Tr_{32}$ are defined as follows:

ON condition for $Tr_{31}$ is (1)

$$\frac{R_{35}}{R_{34} + R_{35}} E \geq V_{D(on)} + V_{BE1(on)}.$$

OFF condition for $Tr_{32}$ is (2)

$$\frac{R_{33}}{R_{32} + R_{33}} \{V_{D(on)} + V_{CE1(sat)}\} < V_{BE1(cut\ in)},$$

wherein $V_{D(on)}$ is the ON voltage of diode $D_{31}$, $V_{BE1(on)}$ is the ON voltage between the base and the emitter of transistor $Tr_{31}$, $V_{CE1(sat)}$ is the saturation voltage between the collector and the emitter of transistor $Tr_{31}$, and $V_{BE2(cut\ in)}$ is the CUT IN voltage between the base and the emitter of transistor $Tr_{32}$.

By suitable selection of circuit constants in such a manner that the transistor $Tr_{31}$ is cut off when the output voltage E of the power source E is gradually reduced to the aforementioned value $E_0$, a feedback is realized to shift the transistor $Tr_{32}$ and $Tr_{33}$ to their ON state and the input port T3 provides a potential substantially determined by the resistance R21 (FIG. 2) and the ON state resistance of transistor $Tr_{33}$. For example, in case of E = 1.8V and $R_{21}$ is nearly equal to several hundred ohms, said port $T_2$ provides a potential lower than 0.5V, and the oscillation of the DC-DC converter A is forcedly interrupted as the transistor $Tr_{21}$ and $Tr_{22}$ are shifted to their OFF state. The operational conditions for the above-mentioned function are expressed as follows.

CUT OFF condition for transistor $Tr_{31}$ is (3)

$$\frac{R_{35}}{R_{34} + R_{35}} E_O < V_{D(cut\ in)} + V_{BE1(cut\ in)}.$$

ON condition for transistor $Tr_{32}$ is (4)

$$\frac{R_{33}}{R_{31} + R_{32} + R_{33}} E_O \geq V_{BE2(on)} = V_{BE3(on)},$$

where in $V_{D(cut\ in)}$ is the cut in voltage of diode $D_{31}$, $V_{BE1(cut\ in)}$ $Tr_{31}$, $V_{BE2(on)}$ is the ON voltage between the base and the emitter of transistor $Tr_{32}$; and $V_{BE3(on)}$ is the ON voltage between the base and the emitter of transistor $Tr_{33}$.

As thus far explained, the function of the oscillation control circuit shown in FIG. 3 is principally determined by three transistors $Tr_{31}$, $Tr_{32}$ and $Tr_{33}$ which are controlled in such a manner that said transistors $Tr_{32}$ and $Tr_{33}$ are both in OFF or ON states respectively when said transistor $Tr_{31}$ is in an ON or OFF state.

It is to be noted that, for the condition of $E > E_0$, there exists a voltage range where all the transistors $T_{31}$, $Tr_{32}$ and $Tr_{33}$ are in the OFF state. In such range, which appears when $E \leq 1.1$ V in the present embodiment, the potential of the oscillation control terminal $T_3$ of the DC-DC converter A which has been almost zero is elevated almost equal to E, or 1.1 V for example since $R_{21} << R_{22}$, thus allowing the restart of oscillation of said converter A which then supplies output voltages $V_{DD}$ and $V_{GG}$ to the power supply lines $V_{DD}$ and $V_{GG}$. Such voltages are generally far lower than the nominal voltages of an LSI and are therefore incapable of realizing proper operation of the LSI 12.

In order to prevent the shortening of the lifetime of LCD 14 resulting from such phenomenon, it is desirable to have a suitable means to prevent the oscillation of the DC-DC converter A in the voltage range where $E < E_0$ stands. In the present embodiment it is possible to prevent the oscillation of the DC-DC converter A in the voltage range of $E < E_0$ by suitable combinaton of the voltage characteristics of the oscillation control circuit S and the oscillation characteristics of the DC-DC converter A as explained in the following.

Figure 4:
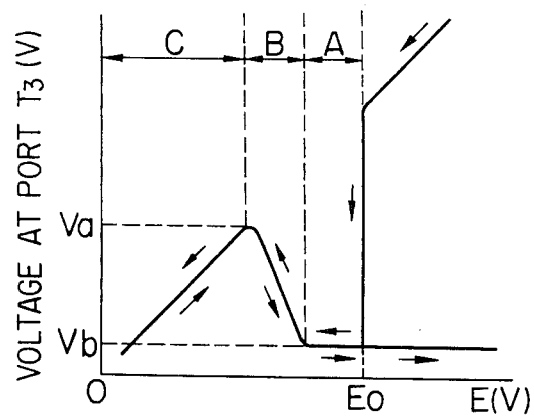
FIG. 4 is a characteristics chart for explaining the function of the above-mentioned embodiment.

Referring to FIG. 4 showing the voltage of aforementioned port $T_3$ as a function of input voltage E, it will be seen that the voltage of port $T_3$ shows a hysteresis as indicated by the arrows and follows, in the range of $E < E_0$, the same trajectory for a change in input voltage in either direction.

The range of $E < E_0$ is divided into three areas A, B and C wherein the area A represents a situation with the transistor $Tr_{31}$ in the OFF state and the transistors $Tr_{32}$ and $Tr_{33}$ in the ON state, where $V_b$ stands for the saturation voltage of said transistor $Tr_{33}$.

In the area B the transistor $Tr_{31}$ is in the OFF state, while the transistors $Tr_{32}$ and $Tr_{33}$ are shifted from the saturation area to the active area thereof due to the lowered base voltage thereof. Consequently the collector voltages of said transistors $Tr_{32}$ and $Tr_{33}$ are accordingly elevated in this state.

A further reduction of the voltage E reduces the base voltages of transistors $Tr_{32}$ and $Tr_{33}$ to enter the area C wherein all the transistors $Tr_{31}$, $Tr_{33}$ are in the OFF state. consequently the voltage of port $T_3$ substantially follows the voltage E of the power source E, as $R_{21} << R_{22} + R_{23}$.

Figure 5:
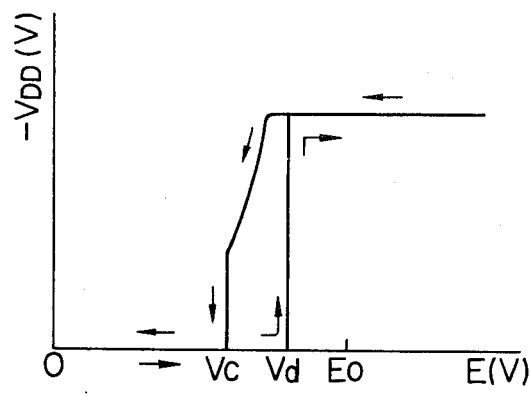
FIG. 5 is a second characteristics chart for explaining the above-mentioned embodiment.

In FIG. 5 showing the relation between $-V_{DD}$ and E in the DC-DC converter of FIG. 2 measured with the port $T_3$ being open, there also exists a hysteresis as indicated by the arrows. With gradual lowering of voltage E, the DC-DC converter A correspondingly reduces its output and terminates oscillation at $E = V_c$ where the output reaches zero. On the other hand, with gradual elevation of the voltage E, the DC-DC converter A starts oscillation only after the voltage E reaches a value $V_d$ to generate the output $V_{DD}$, wherein $V_c < V_d$.

It is now necessary to know the relation between the voltage, of port $T_3$ and the output voltage since the oscillation of said DC-DC converter A is controlled by the bias voltage on the base electrode of transistor $Tr_{21}$ of which direct current bias is in turn determined by the voltage of said port $T_3$. In consideration of the ON-OFF state of the transistor $Tr_{21}$, however, the voltage in the abscissa of FIG. 5 can be considered equal to the voltage of said port $T_3$ since a relation $R_{21} << R_{22} + R_{23}$ stands.

Thus, the function of the circuit shown in FIG. 3 can be explained, with reference to FIGS. 4 and 5, as follows in terms of the voltage E.

1. On a condition $E > E_0$, nominal voltage $V_{DD}$ and $V_{GG}$ can be obtained:

2. On a condition $E = E_0$, the voltage of port $T_3$ changes to $V_b$. The oscillation of the DC-DC converter is terminated since $V_b < V_c$, as the $V_c$ in the present embodiment is ca. 1.1 V. (corresponding to area A in FIG. 4).

3. At a further lower value of E (areas B and C), the voltage of port $T_3$ may be elevated to a maximum value of $V_a$. However, in the present embodiment where $V_a$ is ca. 1.1 V, the DC-DC converter remains in the unoscillating state and does not generate, therefore, $V_{DD}$ and $V_{GG}$ since $V_a < V_d$.

4. Upon gradual increase of the voltage E, and even in the range where $E > E_0$, the DC-DC converter remains in the unoscillating state since the voltage of port $T_3$ is lower than $V_{bb}$.

The oscillation of the DC-DC converter can simply be restarted by opening the switch SW and reclosing said switch when a condition $E > E_0$ is reached.

Figure 6:
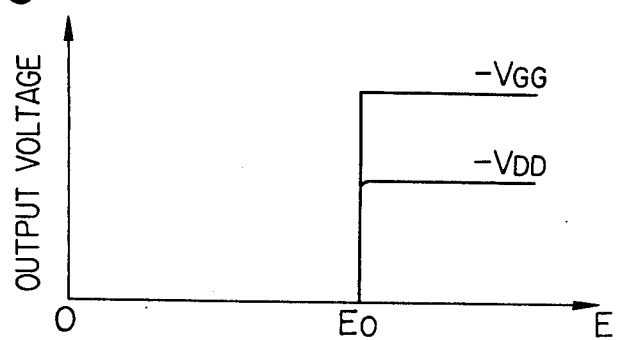
FIG. 6 is a third characteristics chart for explaining the relation between the output of the power source and that of the voltage stabilizing unit in the above-mentioned embodiment.

The above situation can be summarized as shown in FIG. 6.

Figure 7:
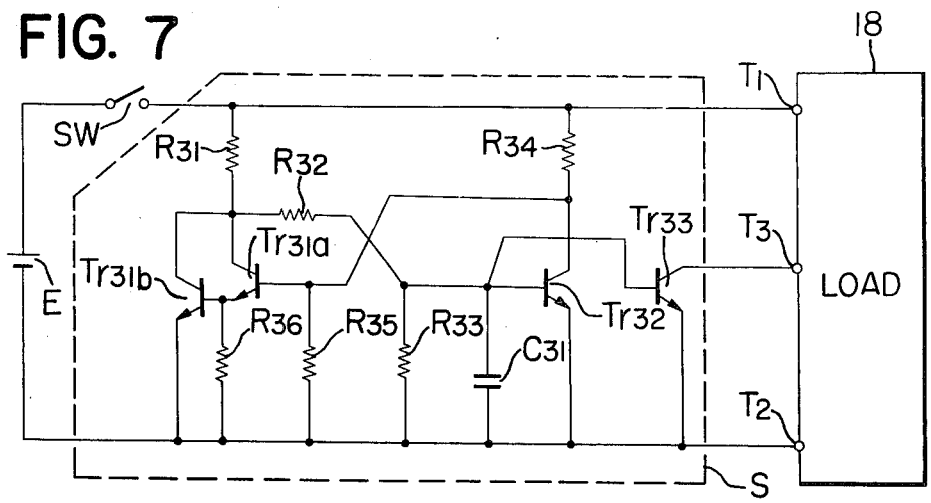
FIG. 7 is a circuit diagram showing another embodiment of the control unit for controlling said voltage stabilizing unit.

FIG. 7 shows a variation of the embodiment shown in FIG. 3, wherein the transistor $Tr_{31}$ and the diode $D_{31}$ in FIG. 3 are replaced by transistors $Tr_{31a}$ and $Tr_{31b}$ and a resistor $R_{36}$, said replacement allowing use of a commercially available unit component incorporating such transistors $Tr_{31a}$ and $Tr_{31b}$ and a resistor, and also to improve the switching characteristics.

Figure 8:
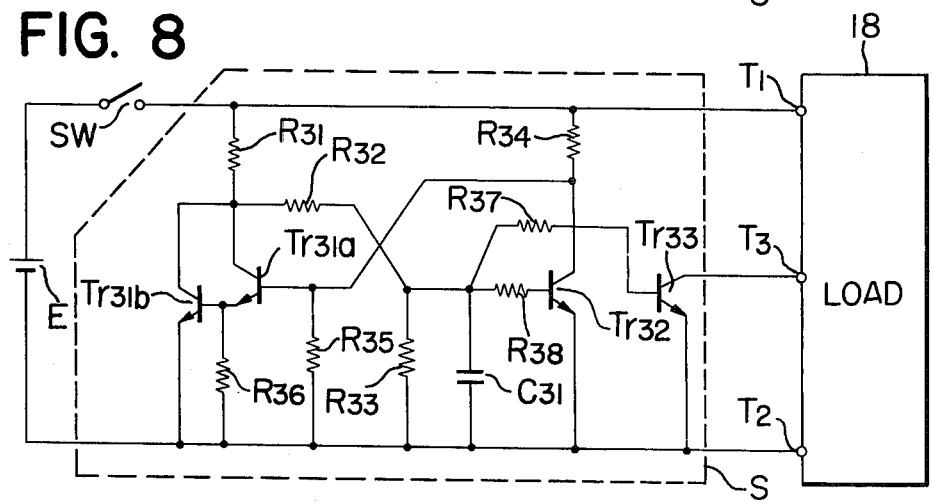
FIG. 8 is a circuit diagram showing still another embodiment of the control unit for controlling the voltage stabilizing unit.

FIG. 8 shows another variation of the embodiment shown in FIG. 3 wherein the resistors $R_{37}$ and $R_{38}$ are inserted into the base electrode path of the transistors $Tr_{32}$ and $Tr_{33}$ in order to compensate the difference of $V_{BE(on)}$ therebetween.

Figure 9:
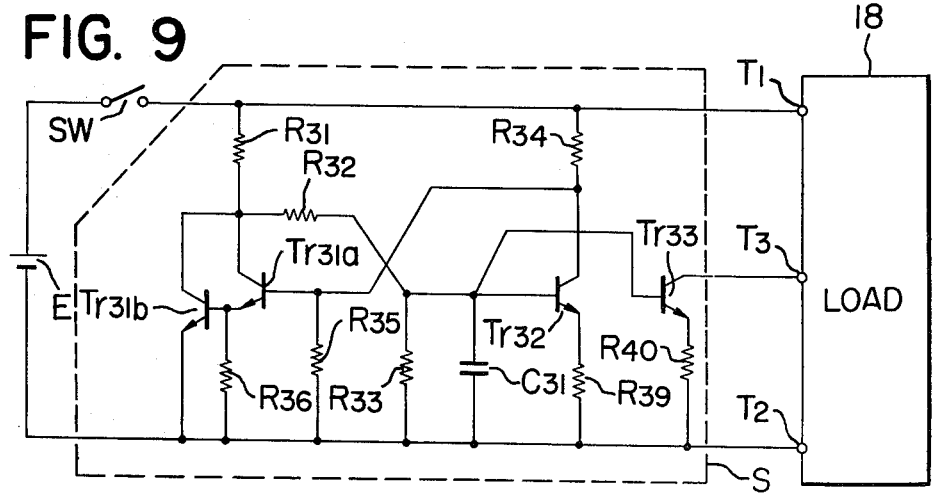
FIG. 9 is a circuit diagram showing still another embodiment of the control unit for controlling the voltage stabilizing unit.

FIG. 9 shows still another variation of the embodiment shown in FIG. 3 wherein the resistors $R_{39}$ and $R_{40}$ are connected to the emitters of transistors $Tr_{32}$ and $Tr_{33}$ in order to compensate the difference of $V_{BE(on)}$ therebetween. Such resistors also function as compensating for temperature.

In the foregoing embodiments, prevention of shortening of the lifetime of an LCD is realized by detecting the input voltage to a stabilized voltage source such as a DC-DC converter, but the same effect can be expected also by detecting the output voltage of such a stabilized voltage source.

In the following there is given an explanation on the function of another embodiment of the present invention shown in FIG. 10, wherein 20 designates a DC-DC converter provided with an input port $T_4$ and an output port $T_5$ for releasing, for example, the output $V_{DD}$. Upon closing of the power switch SW, a transient current passing through the emitter-base junctions of the transistors $Tr_{100}$ and $Tr_{101}$ and a capacitor $C_{100}$ temporarily shifts said transistors $Tr_{100}$ and $Tr_{101}$ to their ON state. Thus a current is supplied to the DC-DC converter through the input port $T_4$ thereof to cause the output voltage $V_{DD}$ to appear at the output port $T_5$. Although said transient current of capacitor $C_{100}$ vanishes within a short period, the output voltage $V_{DD}$ appearing during said period allows the base current of transistor $Tr_{101}$ to flow to the output port $T_5$ through $R_{101}$ and $D_{100}$. Also the transistor remains in the ON state as the base current thereof is also maintained, and in this manner the function of the DC-DC converter 20 is maintained in the normal condition. When the input voltage E is lowered, the input current to the DC-DC converter 20 gradually increases as shown in FIG. 11, and the absolute value of the output voltage at the output port $T_5$ is gradually reduced. In this manner, the base current of transistor $Tr_{101}$ is reduced and reaches a point, at a certain input voltage $E_0$, where the transistor $Tr_{100}$ is unable to maintain the ON state thereof. Thus the voltage at the input port $T_4$ is lowered, and the voltage $V_{DD}$ is rapidly reduced to zero due to the positive feedback resulting therefrom. In the present embodiment the output voltage of the DC-DC converter 20 is controlled in this manner.

Figure 12:
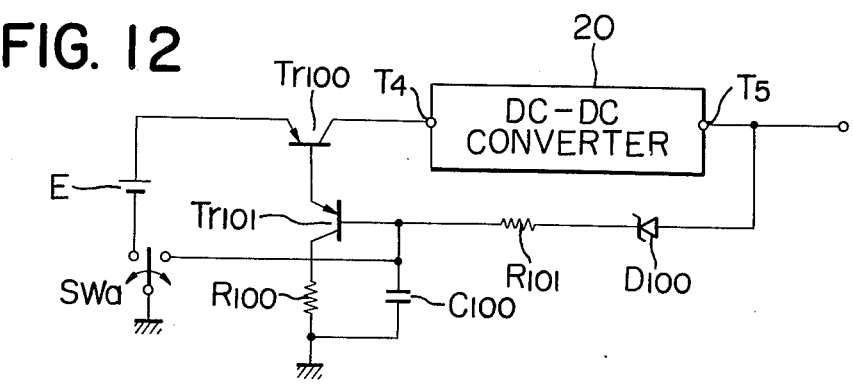
FIG. 12 is a circuit diagram showing a variation of the embodiment shown in FIG. 10.

FIG. 12 shows an another embodiment wherein the capacitor $C_{100}$ is provided with a discharge circuit in order to assure the function of the present circuit when the switch $SW_a$ is closed.

Figure 10:
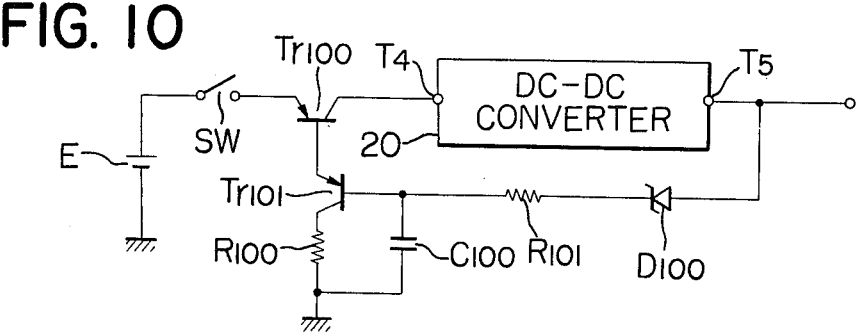
FIG. 10 is a circuit diagram showing another embodiment of the electronic device according to the present invention.
Figure 11:
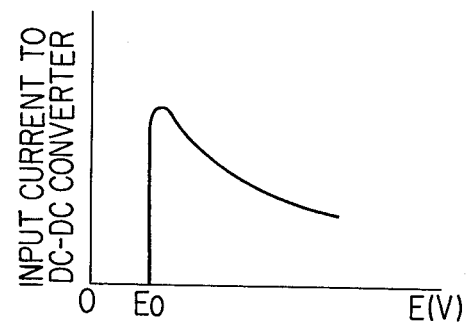
FIG. 11 is a characteristics chart for explaining the embodiment shown in FIG. 10.
Figure 13:
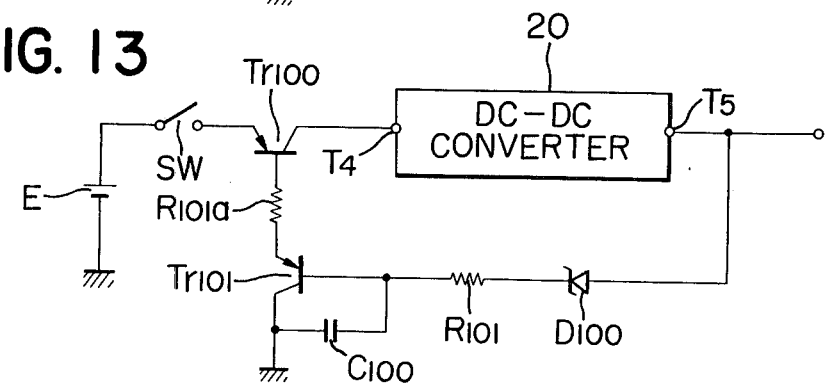
FIG. 13 is a circuit diagram showing another variation of the embodiment shown in FIG. 10

FIG. 13 shows a circuit of another composition for achieving the same function as that in FIG. 10.

In the foregoing embodiments the function of the DC-DC converter is terminated according to the detected voltage of the power source, but it is also possible to electrically connect or disconnect the power supply lines to the LCD by means of the output signal of the oscillation control circuit utilized for terminating the function of said DC-DC converter. In this manner it is possible to protect the LCD unit alone and to retain the information memorized in an electronic network. Also, the user of the electronic device can be advised of the presence of an abnormality in the power supply by the interrupted function of the LCD unit.

What is claimed is:

1. An electronic device comprising:

detection means for coupling to a first voltage source to determine when a voltage applied from the source is outside of a predetermined range and for producing a corresponding detection signal;

means coupled to said detection means for producing a cutoff signal in response to the detection signal from said detection means;

voltage conversion means for coupling to the voltage source for supplying a second voltage for use in said device; and disable means coupled to said cutoff signal means and said voltage conversion means for disabling said conversion means in response to the occurrence of said signal, wherein said disable means has a hysteresis characteristic such that said voltage conversion means is enabled when the voltage applied to said device is greater than a selected value, and said conversion means is disabled when the source voltage decreases a predetermined amount below said selected value.

2. An electronic circuit according to claim 1, further comprising a DC-DC converter coupled to said first voltage source and said disable means, said disable means including means for decoupling said DC-DC converter from said first voltage source in response to said detection signal.

3. An electronic device according to claim 2, wherein said DC-DC converter is inoperative to develop an output voltage when the voltage of said first voltage source is below a predetermined threshold value.

4. An electronic device according to claim 1, further comprising means for coupling the first voltage source to a liquid crystal display, and means coupling said disable means to interrupt the application of said first voltage to the liquid crystal display in response to said detection signal.

5. An electronic device according to claim 4, further comprising a DC-DC converter coupled to a second voltage source and to said disable means, said converter being operative to supply at least a third voltage to a network which drives said liquid crystal display, said disable means including means for decoupling said DC-DC converter from said second voltage source in response to said detection signal.

6. An electronic device according to claim 5, wherein said DC-DC converter is inoperative to develop an output voltage when the voltage of said second voltage source is below a predetermined threshold value.

* * * * *

UNITED STATES PATENT OFFICE
CERTIFICATE OF CORRECTION

Patent No. 4,065,803                    Dated  December 27, 1977

Inventor(s) HIROYUKI MIKADA, JYUJI KISHIMOTO

It is certified that error appears in the above-identified patent and that said Letters Patent are hereby corrected as shown below:

Column 3, line 58, change "BE1" to read --BE2--.

Column 4, line 37, change "$T_{31}$" to read --$Tr_{31}$--.

Column 4, line 56, change "combinaton" to read --combination--.

Column 5, line 12, change "consequently" to read --Consequently--.

Signed and Sealed this

Eighteenth Day of April 1978

[SEAL]

Attest:

RUTH C. MASON
*Attesting Officer*

LUTRELLE F. PARKER
*Acting Commissioner of Patents and Trademarks*